(12) United States Patent
Manville et al.

(10) Patent No.: US 10,503,737 B1
(45) Date of Patent: Dec. 10, 2019

(54) BLOOM FILTER PARTITIONING

(71) Applicant: Maginatics LLC, Mountain View, CA (US)

(72) Inventors: Thomas Manville, Moutain View, CA (US); Julio Lopez, Moutain View, CA (US); Shrinand Javadekar, Sunnyvale, CA (US)

(73) Assignee: Maginatics LLC, Mountain View, CA (US)

( * ) Notice: Subject to any disclaimer, the term of this patent is extended or adjusted under 35 U.S.C. 154(b) by 470 days.

(21) Appl. No.: 14/675,476

(22) Filed: Mar. 31, 2015

(51) Int. Cl.
*G06F 16/2455* (2019.01)

(52) U.S. Cl.
CPC .............................. *G06F 16/24554* (2019.01)

(58) Field of Classification Search
None
See application file for complete search history.

(56) References Cited

U.S. PATENT DOCUMENTS

| | | | | |
|---|---|---|---|---|
| 9,110,792 | B1 * | 8/2015 | Douglis | G06F 12/0269 |
| 2005/0219929 | A1 * | 10/2005 | Navas | H04L 45/7453 |
| | | | | 365/212 |
| 2008/0243800 | A1 * | 10/2008 | Beyer | G06F 12/0864 |
| 2008/0307189 | A1 * | 12/2008 | Mityagin | G06F 17/30011 |
| | | | | 711/173 |
| 2008/0313132 | A1 * | 12/2008 | Hao | H04L 45/00 |
| 2009/0037456 | A1 * | 2/2009 | Kirshenbaum | G06F 16/137 |
| 2011/0055621 | A1 * | 3/2011 | Mandagere | G06F 11/1435 |
| | | | | 714/6.3 |
| 2013/0166576 | A1 * | 6/2013 | Hudzia | G06F 17/30324 |
| | | | | 707/754 |
| 2015/0324410 | A1 * | 11/2015 | Glover | G06F 16/00 |
| | | | | 707/610 |
| 2017/0046395 | A1 * | 2/2017 | Li | G06F 17/3033 |

FOREIGN PATENT DOCUMENTS

EP           2487610 A2 *  8/2012    ......... G06F 17/3033

* cited by examiner

*Primary Examiner* — Alex Gofman
*Assistant Examiner* — Umar Mian
(74) *Attorney, Agent, or Firm* — Van Pelt, Yi & James LLP

(57) ABSTRACT

A partitioned Bloom filter is disclosed. In various embodiments, a representation of an item is received. The representation is used to determine a partition with which the item is associated. A partition-specific Bloom filter is used to determine at least in part whether the item may be an element of a set with which the partition is associated.

22 Claims, 16 Drawing Sheets

BLOOM FILTER PARTITIONING

BACKGROUND OF THE INVENTION

Bloom filters provide a space efficient way to store data that can be used to test whether an element is a member of a set. A Bloom filter may comprise a bit array of m bits. One or more hash functions k may be used to map a given item or a corresponding one or more locations in the array. For example, an element A may be mapped to a filter location by computing the hash of the element A modulo the size of the array. As an element is added to the set, the corresponding bits may be set, e.g., by changing an initial/default value of "0" to "1".

When a Bloom filter is used to determine membership in a set, false positives are possible, since for two or more different items the respective hash values modulo the array size may be the same. However, false negatives are not possible, since if the element is already a member of the set the corresponding bit(s) in the filter would be found to have been set.

In some applications, a Bloom filter may be used to determine whether an element is already in a set. If the filter result is positive, a further query, e.g., of a database table, may be performed to determine conclusively whether the element is in the set. If the filter result is negative, the database query does not need to be performed.

Typically, for an array of a given size, the probability of false positives increases the more elements that are added to the set. Typically, the false positive probability increases at a specific, calculable rate. The false positive rate can be reduced by increasing the size of the array, but typically resizing requires that the entire filter be rebuilt, e.g., by iterating over the elements in the set to populate the newly-resized filter array. For a set having a very large number of elements, the time, computing, and other resources required to rebuild the filter after resizing may be prohibitive.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Partitioning a set or set space into two or more partitions and providing a separate, partition-specific Bloom filter for each partition is disclosed. In various embodiments, set membership may be determined at least in part by using the partition-specific Bloom filters. In some embodiments, the computed false positive probability or other criteria may be used to determine to resize and rebuild a partition-specific Bloom filter. In various embodiments, partition-specific Bloom filters may be resized and/or rebuilt independently of other partition-specific Bloom filters associated with other partitions, enabling such other partition-specific Bloom filters to remain available for use. In various embodiments, techniques disclosed herein may be used in connection with a variety of different types of Bloom filter, including without limitation a counting Bloom filter.

Figure 1:
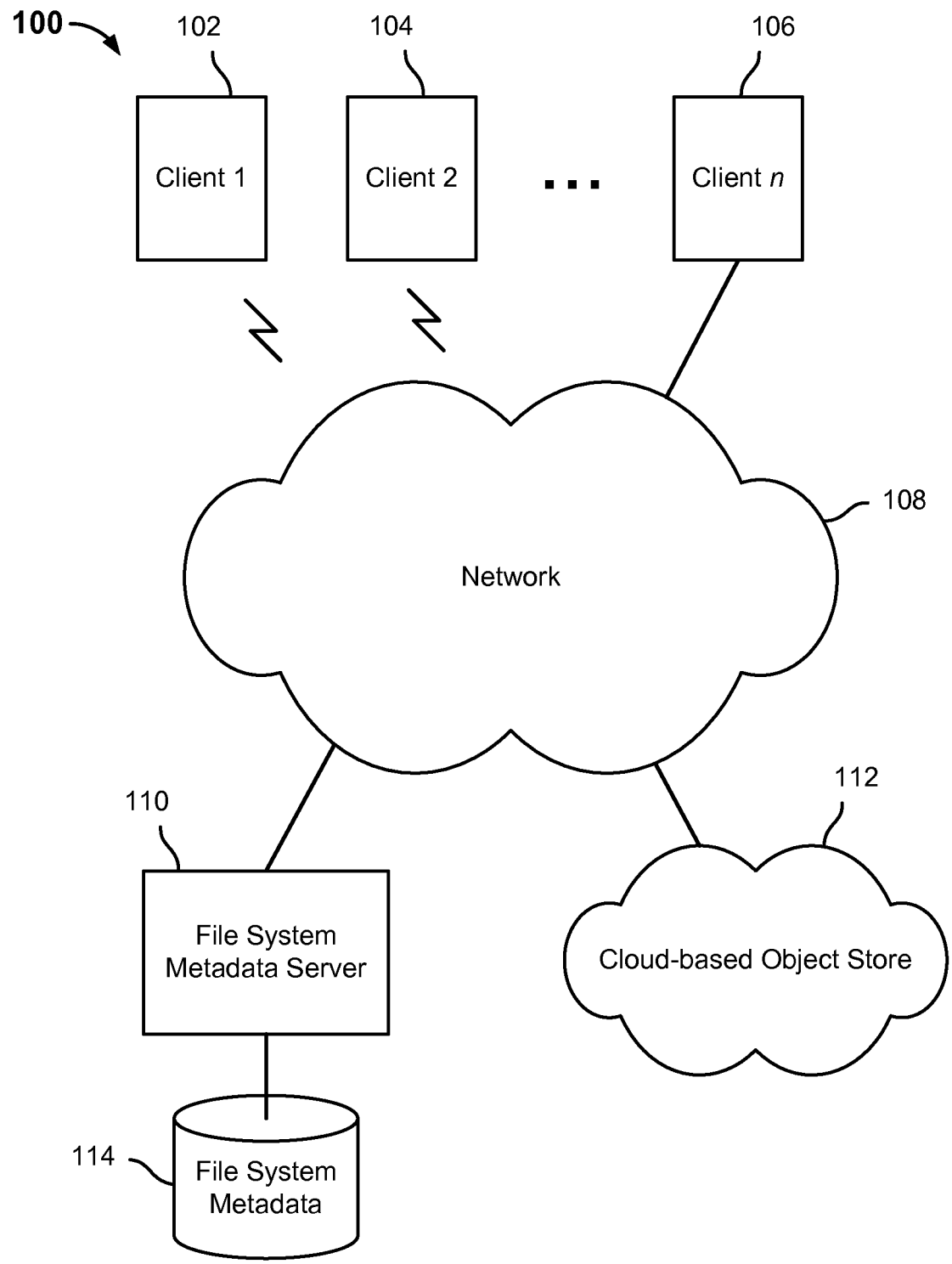
FIG. 1 is a block diagram illustrating an embodiment of a distributed file system and environment.

FIG. 1 is a block diagram illustrating an embodiment of a distributed file system and environment. In the example shown, the distributed file system environment 100 includes a plurality of client systems and/or devices, represented in FIG. 1 by clients 102, 104, and 106. In the example shown, the clients connect (wireless or otherwise) to a network 108, e.g., one or more of a local area network (LAN), a wide area network (WAN), the Internet, and/or one or more other public and/or private networks. The clients have access via network 108 to a file system metadata server 110. Applications on the respective clients, such as clients 102, 104, and 106, make file system calls, which result in various embodiments in corresponding remote calls being made to file system metadata server 110. For example, a file system client, agent, or other entity on the client may intercept or otherwise receive calls by the application to a local (e.g., native) file system, and may redirect such calls to an agent configured to make corresponding remote calls to file system metadata server 110 (e.g., transparently to the application).

In the example shown, data comprising objects stored in the file system, such as files, is stored in a cloud-based object store 112. In some embodiments, files may be segmented into a plurality of segments or "chunks", each of which is stored in a corresponding location in the cloud-based object store. File system calls are made to file system metadata server 110, which stores file system metadata in a file system metadata storage 114, e.g., in a database or other data store. File system metadata server 110 may store in file system metadata store 114, for example, a segment or "chunk" map for each file or other object stored and represented in the file system. For example, for each file name (e.g., pathname) the file system metadata server 110 may store in a corresponding segment map a hash or other representation of each segment, and for each a corresponding location in which the segment is (or is to be) stored in cloud-based object store 112. Other file system metadata, such as metadata typically stored by a file system, may be stored by file system metadata server 110 in file system metadata store 114. Examples include, without limitation, a directory, file, or other node/object name; an identification of parent and/or child nodes; a creation time; a user that created and/or owns the object; a time last modified and/or other time; an end-of-file (EOF) or other value indicative of object size; security attributes such as a classification, access control list, etc.; and/or other file system metadata.

While in the example shown in FIG. 1 the file system metadata server 110 and the cloud-based object store 112 are shown as separate systems, located in different networks and/or physical locations, in other embodiments the file system metadata and file system content data may be stored together, e.g., both on cloud-based resources and/or both on enterprise or other network servers, etc.

Figure 2:
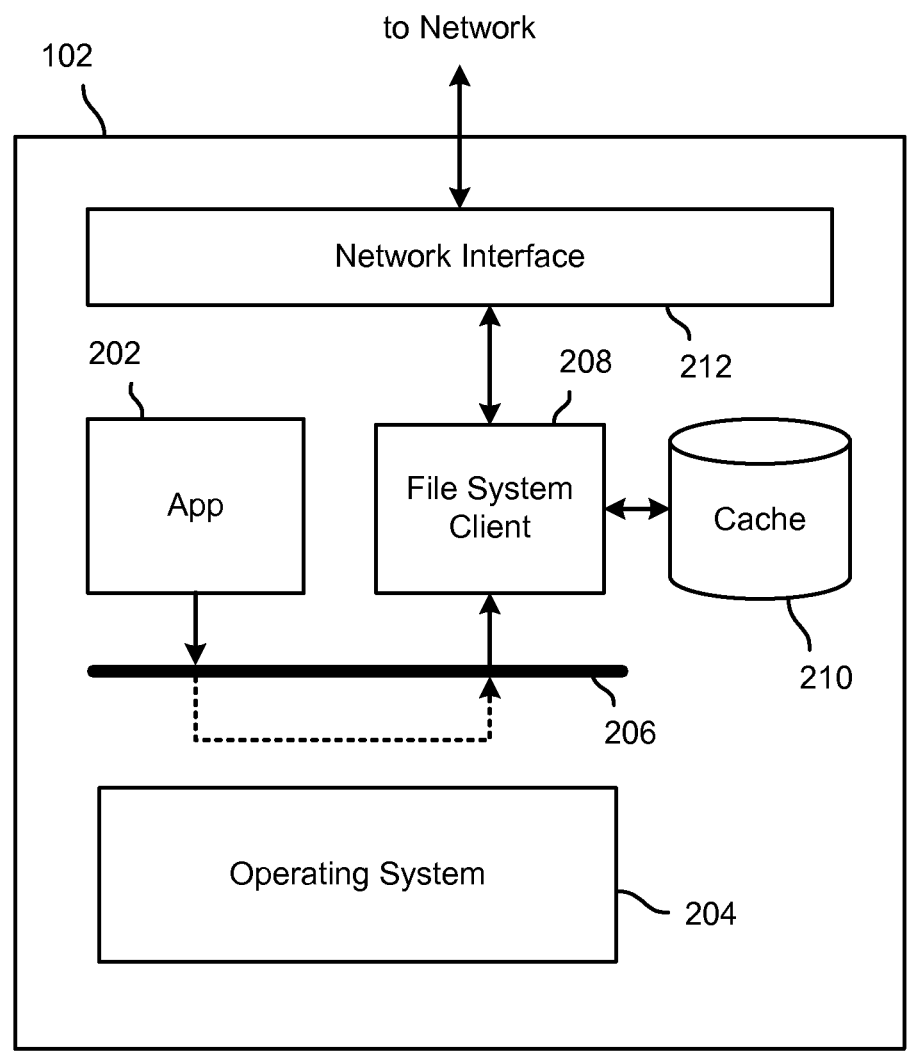
FIG. 2 is a block diagram illustrating an embodiment of a client system.

FIG. 2 is a block diagram illustrating an embodiment of a client system. In the example shown, the client system/device 102 of FIG. 1 is shown to include an application 202 running in an environment provided by an operating system 204. The operating system 204 includes a kernel (not shown) and other components configured to provide services and/or functionality to applications such as application 202. For example, operating system 204 may include and/or be configured to provide access to a native file system (not shown) of client system 102. Application 202 may be configured to make file system calls to the native file system, e.g., to store files or other objects created by/using application 202, to modify, move, or delete such objects, etc. In the example shown, file system calls made by application 202, represented in FIG. 2 by the downward pointing arrow originating in the block labeled "app" (202), are intercepted by a kernel module (or other component) 206 and redirected to a file system client (or other file system agent) 208. In some embodiments, file system agent 208 comprises a client application running in user space. In some embodiments, file system agent 208 comprises a kernel or other operating system component or module. File system client 208 in this example has associated therewith a local cache 210. In various embodiment, cache 210 may be used to buffer and/or otherwise stage file data prior to its being sent to remote storage (e.g., cloud-based object store 112 of FIG. 1), and/or to facilitate access to data stored previously but to which access may be requested later.

The client system 102 includes a network communication interface 212 that provides network connectivity, e.g., to a network such as network 108 of FIG. 1. For example, a request from app 202 to access a file stored remotely in various embodiments may result in file system client 208 making a remote call, via network communication interface 212, for example to a file system metadata server such as server 110 of FIG. 1.

In various embodiments, file system client 208 may be configured to store in a metadata write buffer comprising or otherwise associated with file system client 208 and/or cache 210 one or more file system operations and/or requests affecting file system metadata comprising a portion of the file system metadata with respect to which a file system metadata write lease is held by file system client 208. For example, file system operations affecting metadata may be buffered as received, e.g., as a result of local file system calls by applications such as application 202 of FIG. 2, and may be communicated to the remote file system metadata server asynchronously and/or upon occurrence of an event, e.g., receipt of an indication that a metadata write lease "break" event has been received and/or has occurred. For example, a second client system may indicate a desire and need to perform operations affecting a portion of the file system metadata with respect to which a first client system holds a lease, result in a "break" communication being sent to the first client system, which in turns "flushes" at least those operations in the buffer that affect the portion of metadata with respect to which the lease had been held.

Figure 3:
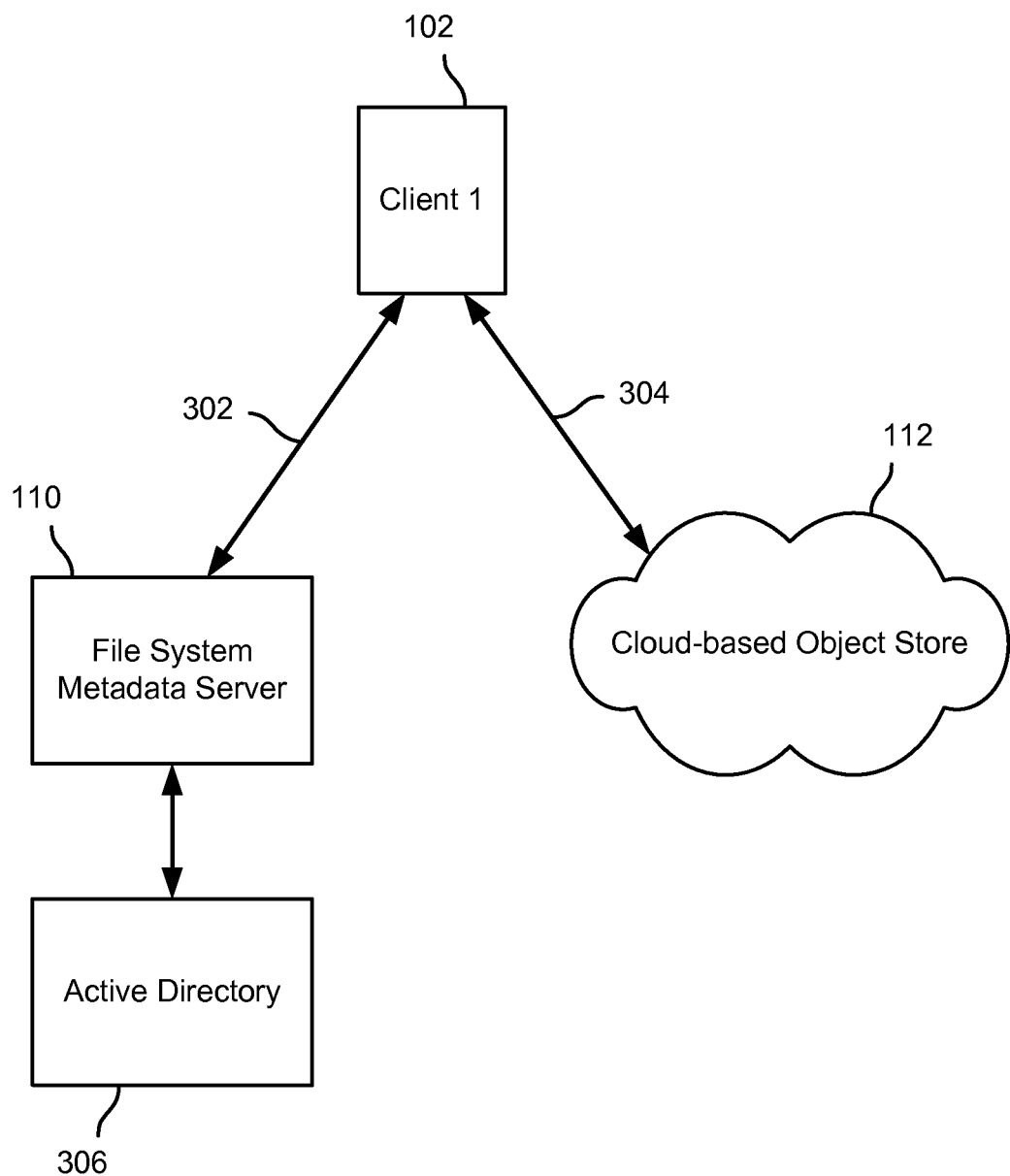
FIG. 3 is a block diagram illustrating an embodiment of a distributed file system.

FIG. 3 is a block diagram illustrating an embodiment of a distributed file system. In the example shown, client 102 communicates via a secure session-based connection 302 with file system metadata server 110. In addition, client 102 communicates with cloud-based object store 112 via a TCP/IP or other connection that enables client 102 to store objects (e.g., file segments or "chunks") via HTTP "PUT" requests and to retrieve segments ("chunks") via HTTP "GET" requests. In various embodiments, client 102 (e.g., a file system client or other agent running on client 102) sends and receives distributed file system "control plane" communications via secure connection 302 (e.g., file system operations that change or require the processing and/or use of file system metadata), whereas communicates sent via connection 304 may be considered to comprising a "data plane" via which file system object data (i.e., segments or "chunks") may be stored and/or retrieved. In the example shown, file system metadata server 110 has access to active directory 306, which in various embodiments may comprise information usable to authenticate users of clients such as client 102.

In various embodiments, file system objects, such as files, may be stored by a client on which a distribute file system client or other agent has been installed. Upon receiving a request to store (or modify) a file system object, in various embodiments the file system client segments the object into one or more segments or "chunks" and computes a reference (e.g., a hash) for each. The references are included in a file system request sent to the file system metadata server, e.g., via a secure connection such as connection 302 of FIG. 3. The file system metadata server returns information to be used by the file system client to store (non-duplicate) segments/chunks in the cloud-based object store by sending the segment data directly to the cloud-based object store, e.g., via PUT requests sent via a connection such as connection 304 of FIG. 3.

Figure 4:
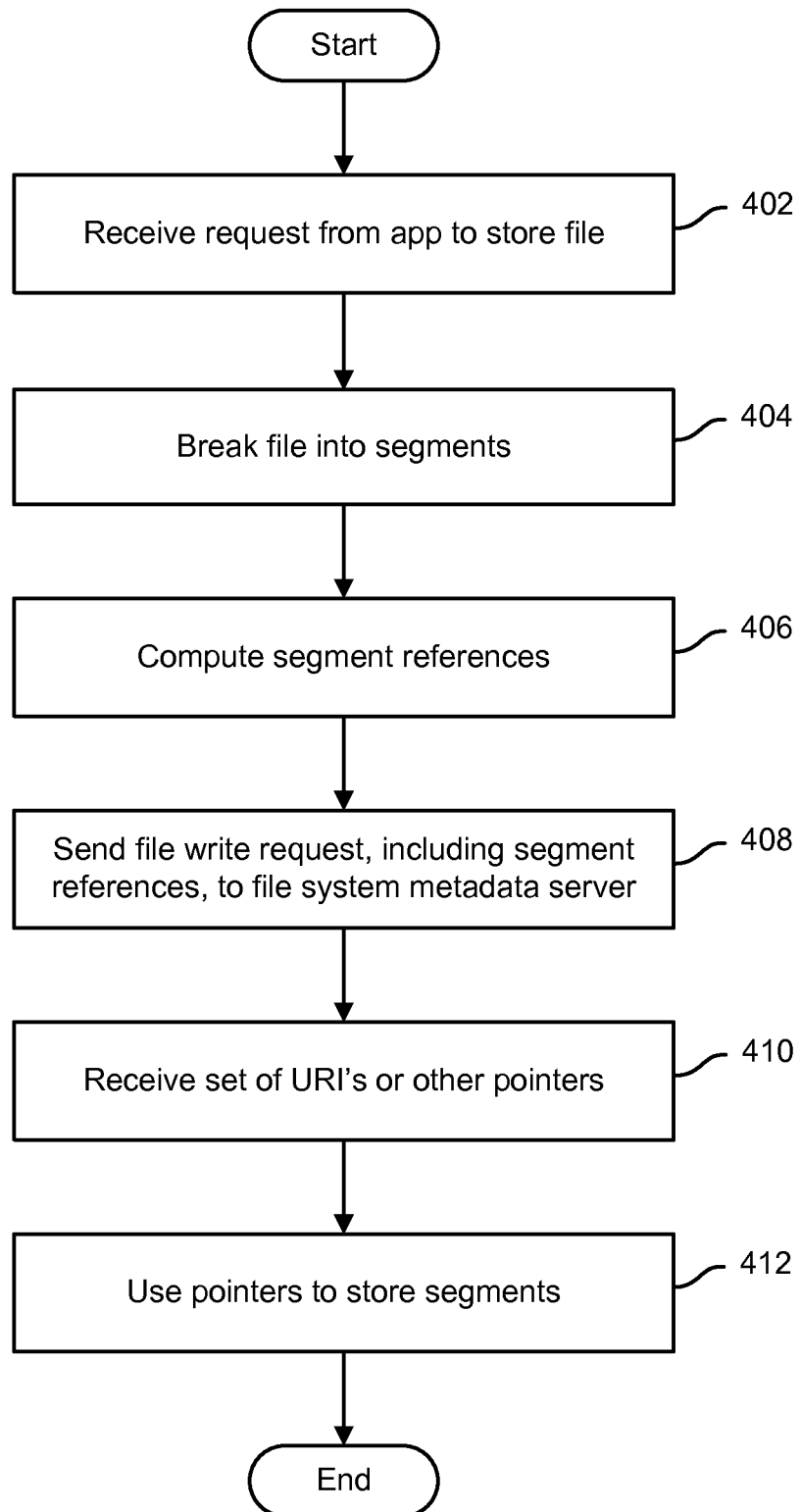
FIG. 4 is a flow chart illustrating an embodiment of a process to store a file or other file system object in a distributed file system.

FIG. 4 is a flow chart illustrating an embodiment of a process to store a file or other file system object in a distributed file system. In various embodiments, the process of FIG. 4 may be performed on a client system or device, e.g., by a file system client or other agent running on the client system/device, such as file system client 208 of FIG. 2. In the example shown, a request is received, e.g., from an application, to store a file (402). The file is segmented into one or more segments (404). For each segment, a segment reference, e.g., a hash, is computed (406). A file write request that includes the segment references is sent to the file system metadata server (408). A set of uniform resource indicators (URI's) or other pointers is received from the file system metadata server (410). In various embodiments, the set of pointers may include pointers only for those segments not already stored by the distributed file system. The received pointers are used to store segments, e.g., via HTTP "PUT" requests sent directly to the cloud-based object store (412).

Figure 5:
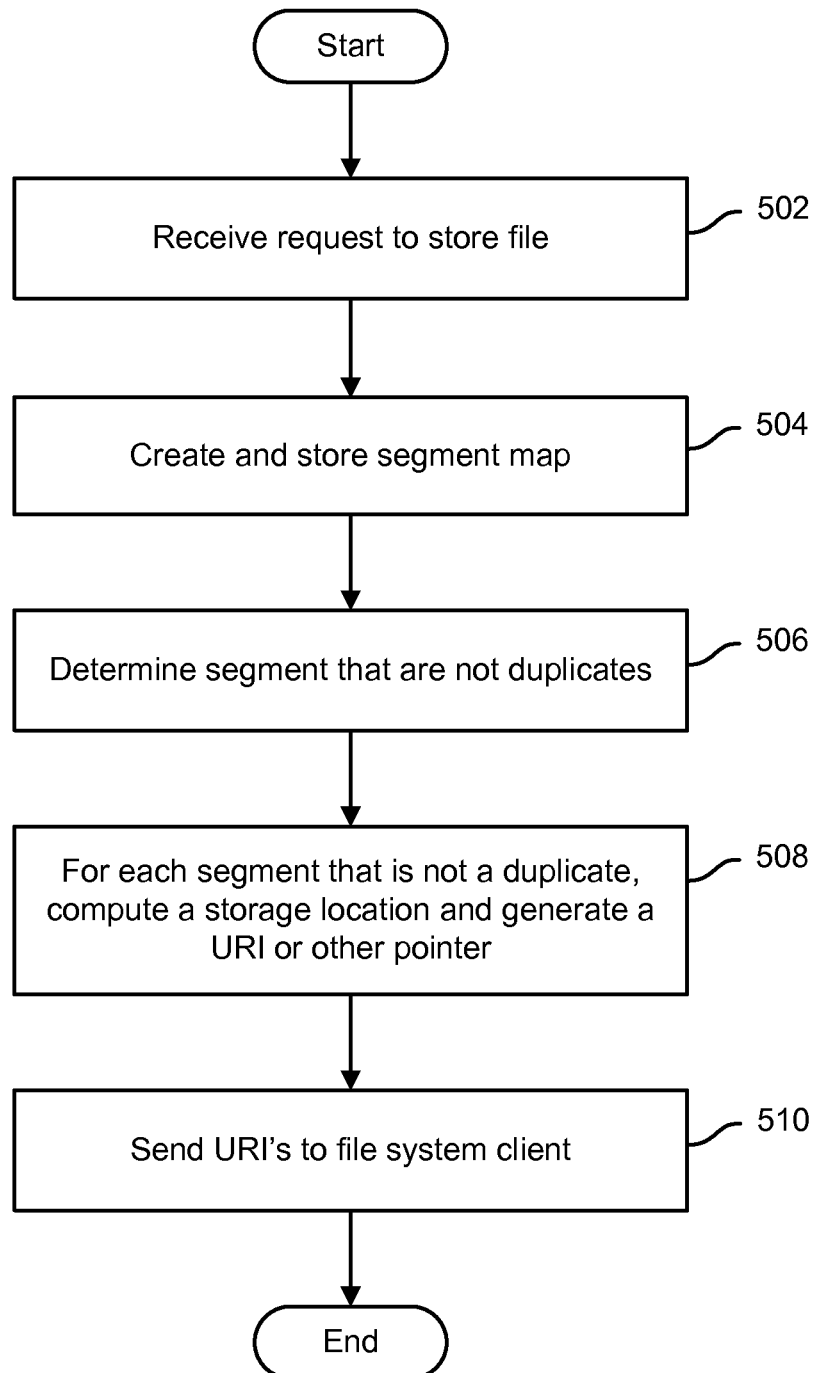
FIG. 5 is a flow chart illustrating an embodiment of a process to handle a request to store a file or other file system object in a distributed file system.

FIG. 5 is a flow chart illustrating an embodiment of a process to handle a request to store a file or other file system object in a distributed file system. In various embodiments, the process of FIG. 5 may be performed by a file system metadata server, such as file system metadata server 110 of FIG. 1. In the example shown, a request to store a file is received (502). A segment ("chunk") map that associates the file system object name and/or other identifier (e.g., file name, pathname) with a set of one or more segment references (e.g., hash values) is created (504). Segments that are not duplicates of segments already stored by the distributed file system are identified, for example based on the segment references (506). For each segment that is not a duplicate, a storage location is computed (e.g., based at least in part on all or part of the segment reference) and a URI or other pointer usable to store the segment directly in the cloud-based data store is generated (508). In various embodiments, the URI or other pointer is signed cryptographically by the file system metadata server. The URI may have an expiration time by which it must be used to store the segment. The URI's are sent to the file system client from which the request to store the file was received (510).

Figure 6:
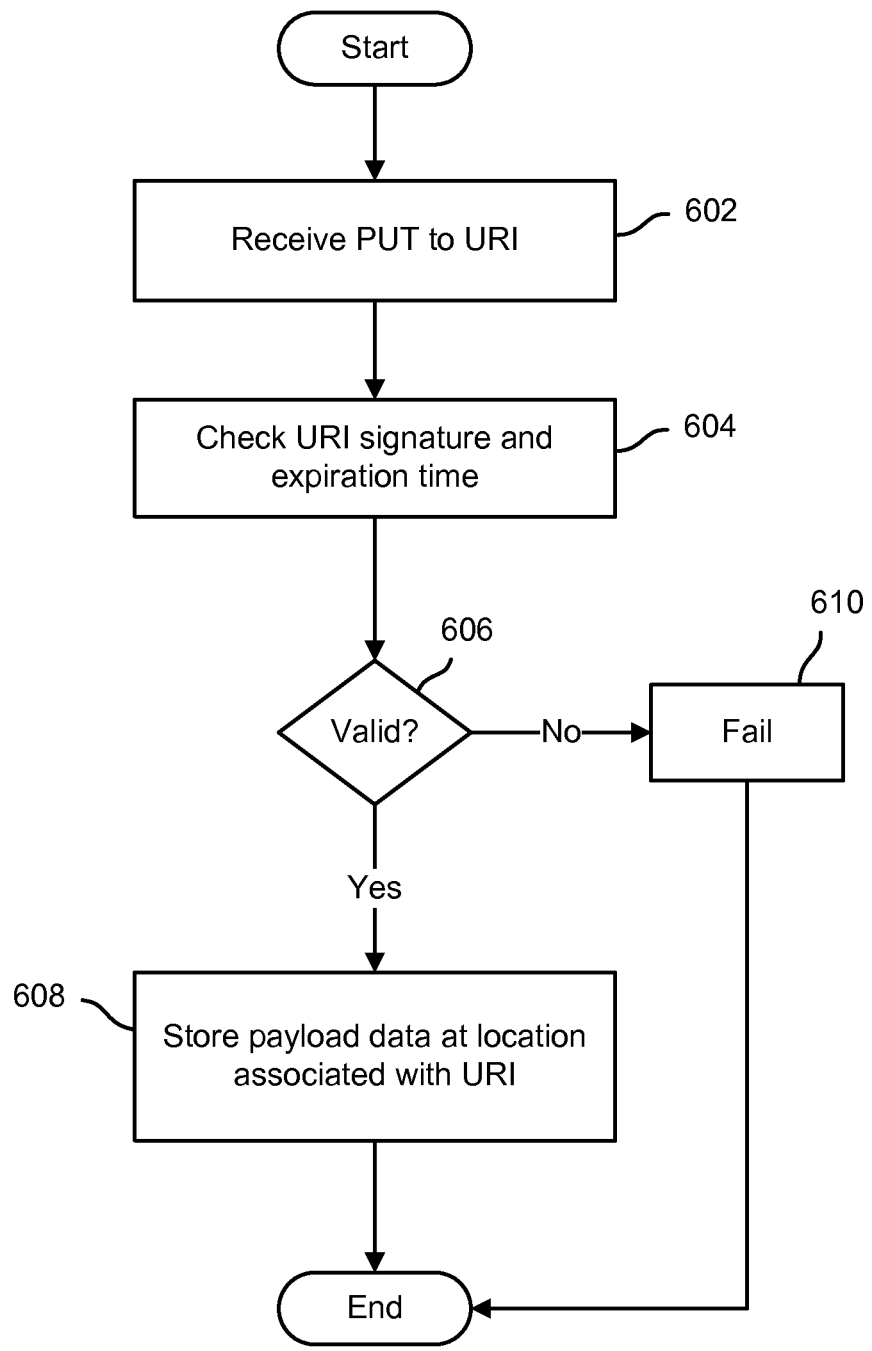
FIG. 6 is a flow chart illustrating an embodiment of a process to store file segment or "chunk" data associated with a distributed file system.

FIG. 6 is a flow chart illustrating an embodiment of a process to store file segment or "chunk" data associated with a distributed file system. In various embodiments, the process of FIG. 6 may be performed by a cloud-based object store, such as object store 112 of FIG. 1. In the example shown, a "PUT" request associated with a URI specified in the request is received (602). A cryptographic signature associated with the URI and an expiration time encoded in the URI are checked (604). For example, the cloud-based object store may be provisioned to check that the URI has been signed by a trusted file system metadata server and/or that an expiration time of the URI has not elapsed. If the URI is determined to be currently valid (606), a payload data associated with the PUT request, e.g., file system object segment or "chunk" data, is stored in a location associated with the URI (608). If the URI is determined to not be valid (606), the PUT request fails (610), and the file system client receives a response indicating it must obtain a new URI from the file system metadata server.

In various embodiments, file system objects, such as files, may be retrieved by a client on which a distribute file system client or other agent has been installed. Upon receiving a request to access a file system object, in various embodiments the file system client sends a file access request to the file system metadata server, e.g., via a secure connection such as connection 302 of FIG. 3. The file system metadata server returns information (e.g., one or more URI's or other pointers) to be used by the file system client to retrieve segments/chunks directly from the cloud-based object store, e.g., via GET requests sent via a connection such as connection 304 of FIG. 3.

Figure 7:
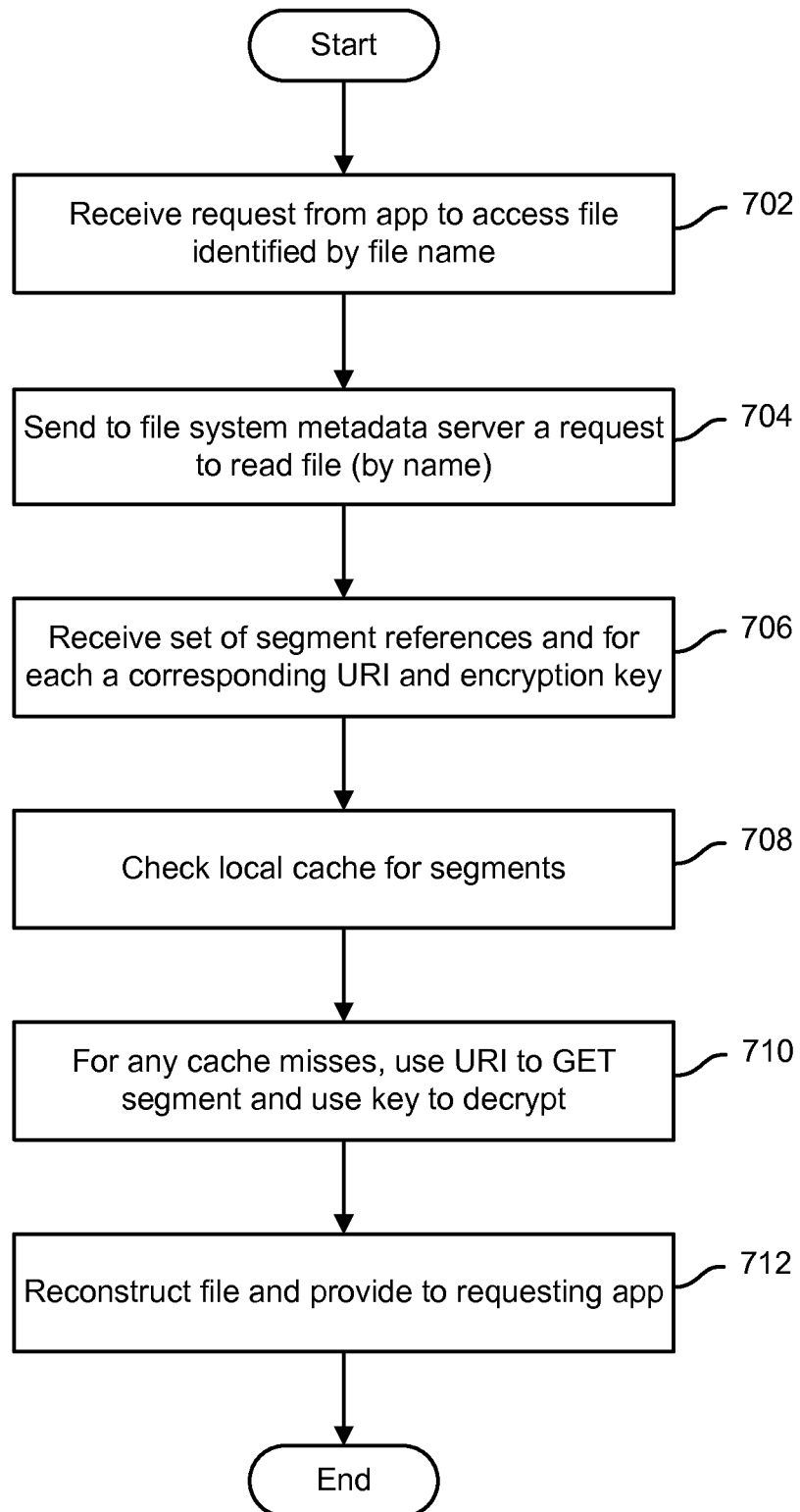
FIG. 7 is a flow chart illustrating an embodiment of a process to access a file or other file system object stored in a distributed file system.

FIG. 7 is a flow chart illustrating an embodiment of a process to access a file or other file system object stored in a distributed file system. In various embodiments, the process of FIG. 4 may be performed on a client system or device, e.g., by a file system client or other agent running on the client system/device, such as file system client 208 of FIG. 2. In the example shown, a request to access a file system object, e.g. a file identified by file name, is received from an application (702). A request is sent to a file system metadata server to retrieve the file (704). A set of segment references, and for each a corresponding URI and encryption key, is received from the file system metadata server (706). A local cache is checked to determine whether any required segments are present in the cache (708). For all segments not present in the cache, the associated URI is used to send a GET request to retrieve the segment from the cloud-based object store, and the associated key is used to decrypt the segment once it has been received from the object store in encrypted form (710). The segments are used to reconstruct the file and provide access to the file to the application from which the access request was received (712).

Figure 8:
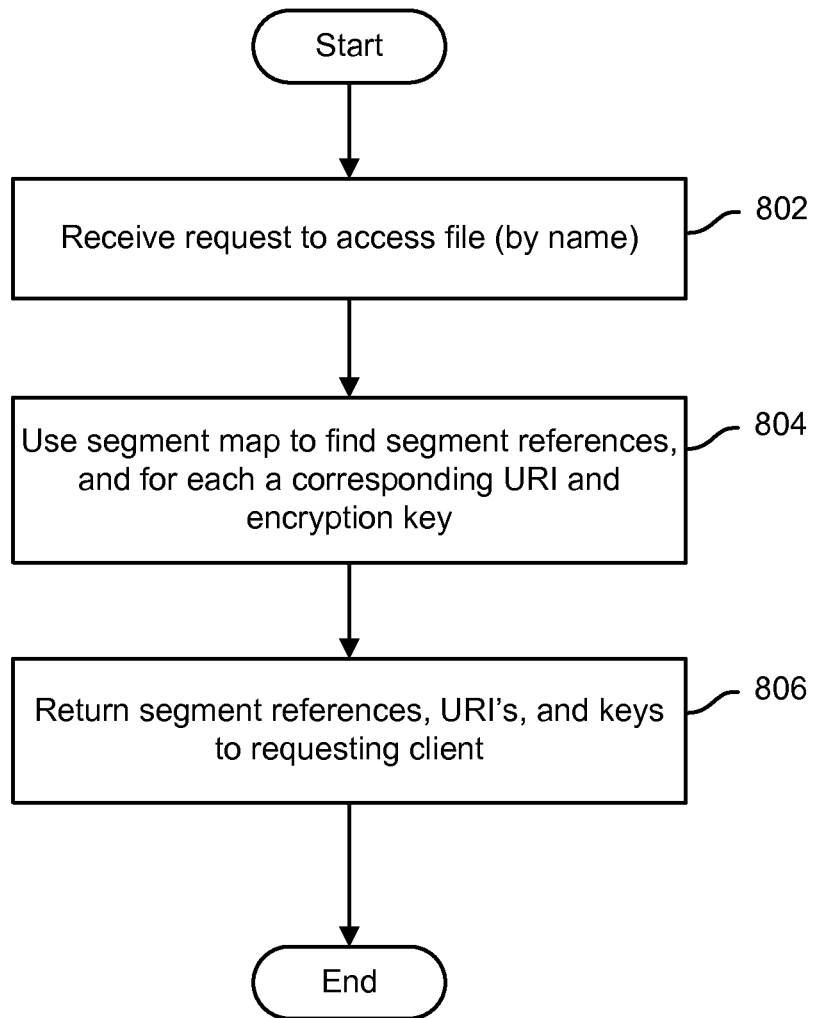
FIG. 8 is a flow chart illustrating an embodiment of a process to handle a request to access a file or other file system object stored in a distributed file system.

FIG. 8 is a flow chart illustrating an embodiment of a process to handle a request to access a file or other file system object stored in a distributed file system. In various embodiments, the process of FIG. 5 may be performed by a file system metadata server, such as file system metadata server 110 of FIG. 1. In the example shown, a request to access a named file is received (802). A segment map associated with the file is retrieved and used to determine a set of segment references (e.g., hashes), and for each a corresponding URI indicating where the segment is stored in the cloud-based segment store and an encryption key usable to decrypt the segment (804). The segment references, URI's, and keys are returned to the file system client from which the file access request was received (806).

Figure 9:
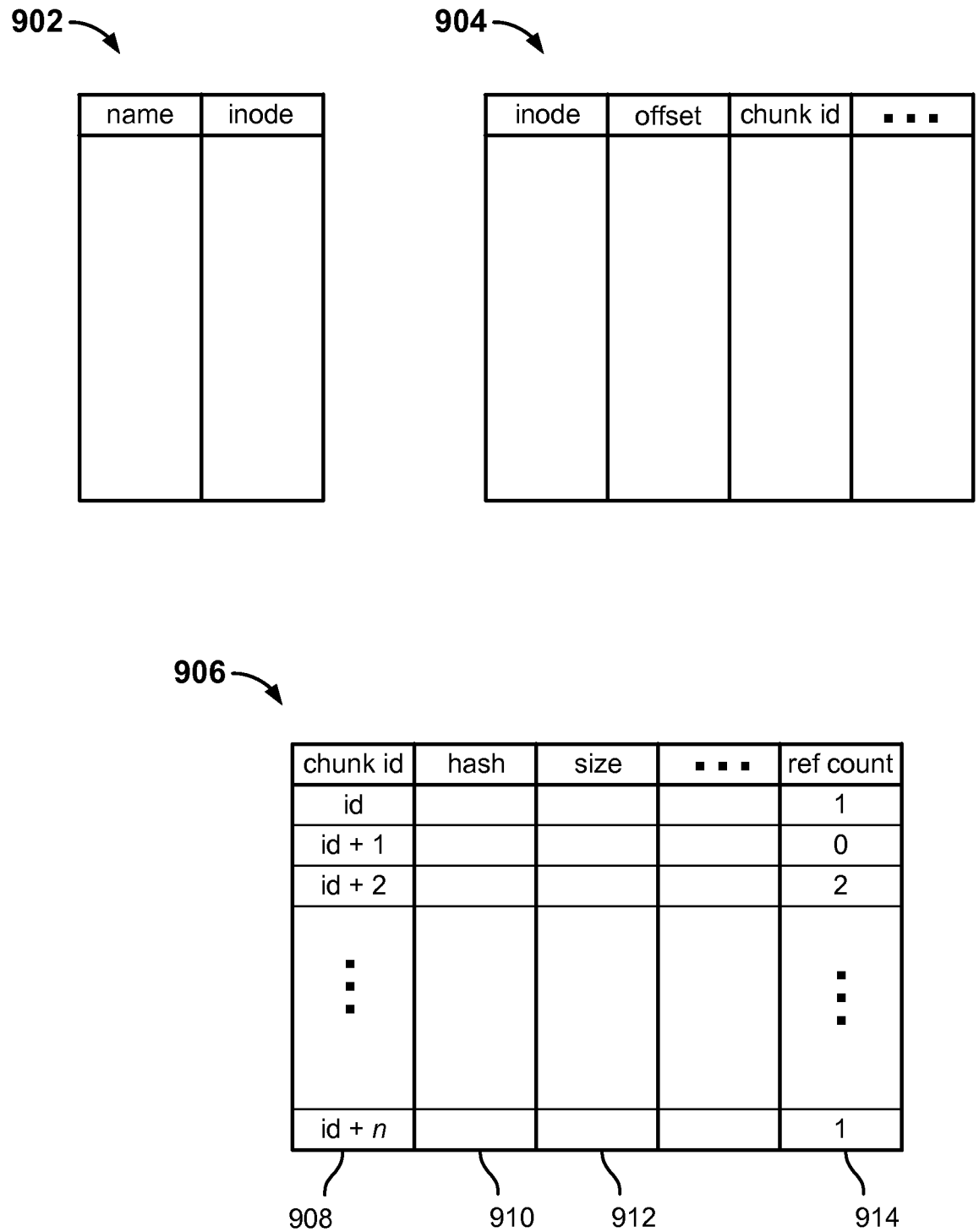
FIG. 9 is a block diagram illustrating an example set of file system metadata tables used in an embodiment of a distributed file system.

FIG. 9 is a block diagram illustrating an example set of file system metadata tables used in an embodiment of a distributed file system. In various embodiments, the tables 902, 904, and 906 of FIG. 9 may be created and maintained by a file system metadata server, such as file system metadata server 110 of FIGS. 1 and 3. In the example shown, an inode table 902 is used to store data associating each named file system object, e.g., directories, files, or other objects, with a corresponding inode or other unique number or identifier. Chunk map table 904 is used in various embodiments to store for each file, and for each of one or more segments (chunks) into which that file has been broken up to be stored, an offset of the chunk within the file, a chunk identifier (chunk id), and other metadata. For example, a file that has been stored as three chunks would have three entries (rows) in table 904, one for each chunk. In various embodiments, the chunk id is a monotonically increasing value, with each successively stored chunk being given a next chunk id in alphanumeric order. In various embodiments, chunks are immutable once stored. If file data is modified, affected data is stored as a new chunk and assigned a next chunk id in order. As a result, a chunk with a higher chunk id by definition was stored subsequent to a chunk with a lower chunk id, and it can be assumed neither was modified since it was created and stored.

Finally, the chunk metadata table 906 includes a row for each chunk, identified by chunk id (column 908 in the example shown), and for each chunk metadata including a hash of (all or a prescribed part of) the chunk contents (sometimes referred to herein as a chunk or segment "reference") (column 910), the size of the chunk (column 912), other metadata, and a reference count (column 914) indicating how many currently live files (or other file system objects) reference the chunk. For example, if a file is created by copying another file, each of them would reference the chunks comprising the file that was copied.

In various embodiments, chunks are stored in an object store, such as object store 112 of FIG. 1, in a de-duplicated manner. Prior to storing a chunk, the file system checks to determine whether the same chunk has already been stored previously. If so, a reference to the chunk as stored previously is associated with the file that has been requested to be stored and a reference count associated with the chunk is incremented. If not, the chunk is added to the object store and corresponding chunk metadata is generated and stored.

One way to determine whether a given chunk has already been stored would be to query the chunk metadata table to determine whether a chunk having the same hash as the chunk is already among the chunks represented in the chunk metadata table, such as chunk metadata table 906 of FIG. 9. However, such a query may become computationally expensive to perform, in particular as the number of chunks represented in the metadata table, and as result the size of table itself, become very large.

In various embodiments, a Bloom filter may be used to facilitate determining whether a chunk has been stored already. Given the characteristics of a Bloom filter, a "negative" result can be relied upon to conclude a given chunk has not yet been stored, obviating the need to query the chunk metadata table prior to make that determination.

Figure 10:
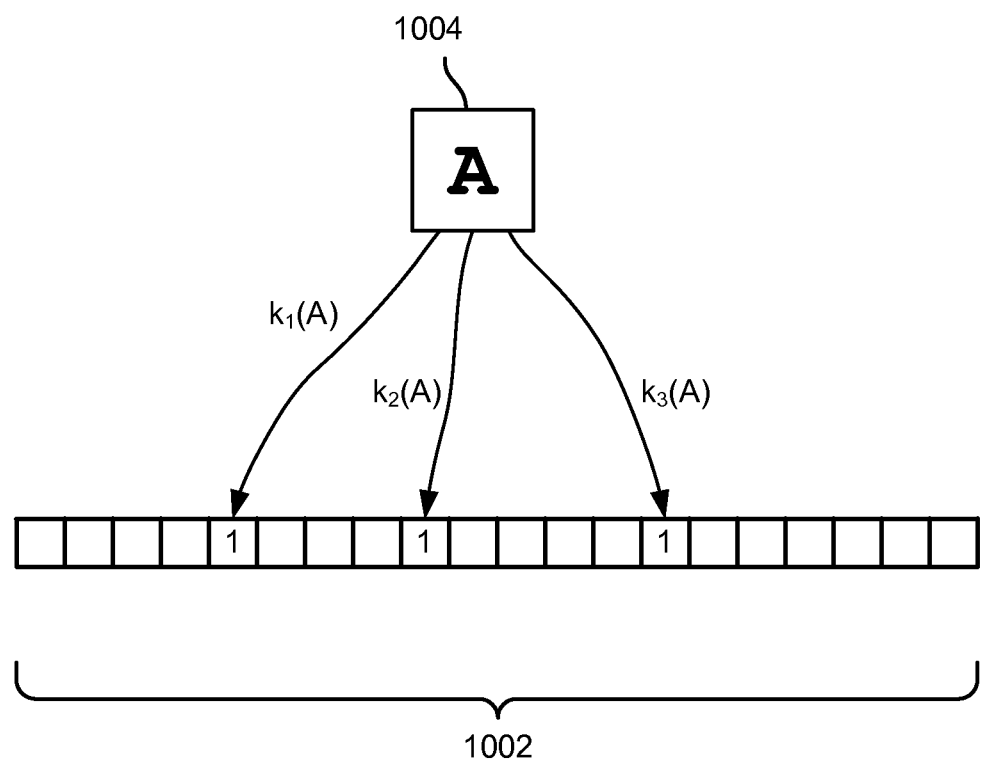
FIG. 10 is a block diagram illustrating an example of a Bloom filter used in an embodiment of a distributed file system.

FIG. 10 is a block diagram illustrating an example of a Bloom filter used in an embodiment of a distributed file system. In various embodiments, the Bloom filter of FIG. 10 may be used by a file system metadata server, such as file system metadata server 110 of FIG. 1, to determine whether a chunk comprising file data has already been stored. In the example shown, a Bloom filter 1002 having m bits is used to determine whether a chunk "A" 1004 might already be present or more definitively is not present in a set of chunks the file system has already stored. In the example shown, three different hash functions are applied to the chunk and the respective results mapped to corresponding bits in the Bloom filter array, e.g., computing the hash modulo the array size. The array locations (bits) to which the respective hash values are mapped have been set in this example to the value "1". Subsequently, if a request to store the same chunk "A" 1004 were received, the hash functions modulo the array size would be computed and would map to the same three locations as shown in FIG. 10, resulting in a "positive" or "true" result indicating to the file system that the chunk "A" might have been stored already. As noted above, due to the possibility of false positives, in the event of a positive or "true" result from the Bloom filter, in various embodiments the file metadata server is configured to query the chunk metadata table (e.g., chunk metadata table 906 of FIG. 9) in the event of a positive or "true" result from the Bloom filter.

Figure 11:
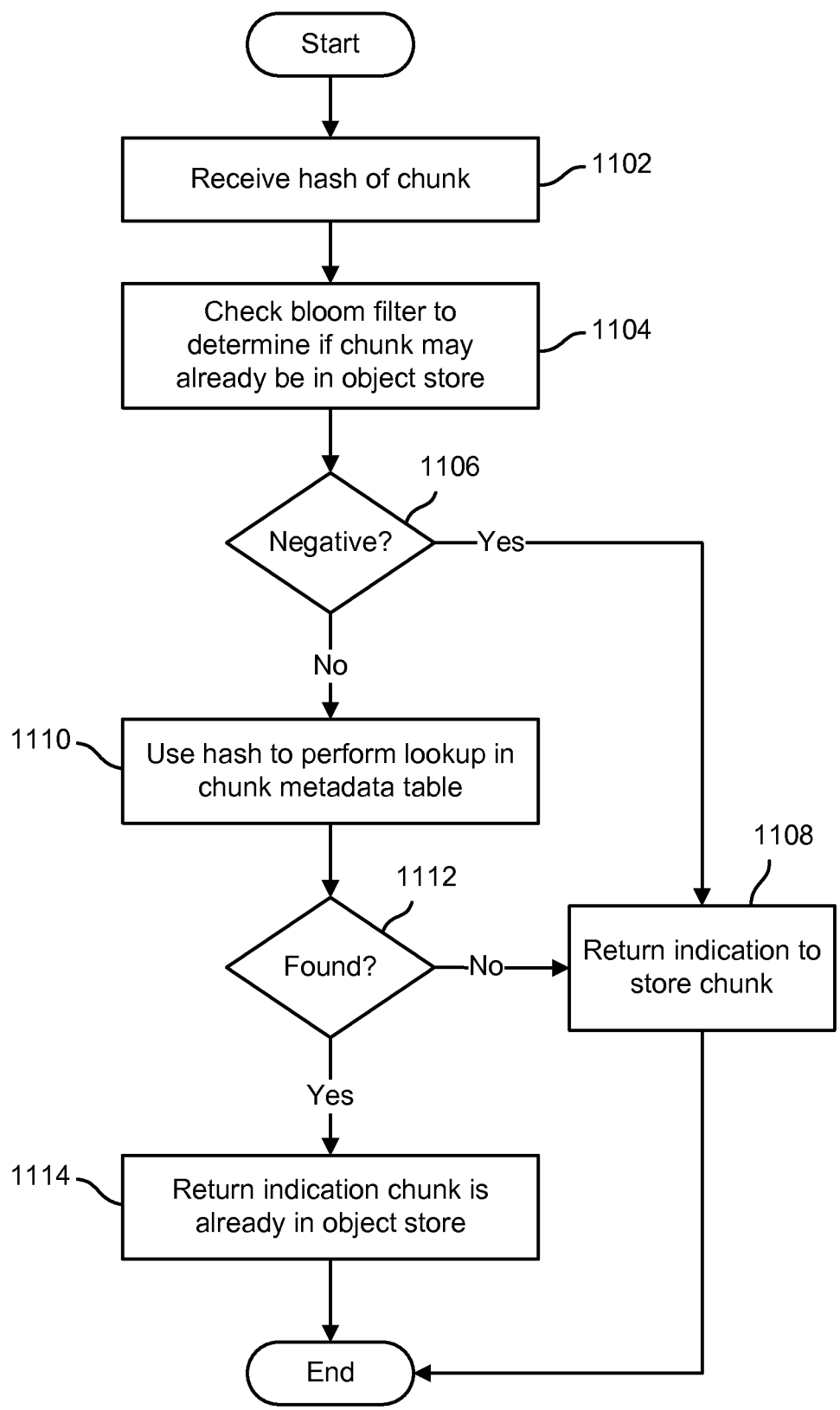
FIG. 11 is a flow chart illustrating an embodiment of a process to use a Bloom filter to determine whether a chunk comprising file data has already been stored.

FIG. 11 is a flow chart illustrating an embodiment of a process to use a Bloom filter to determine whether a chunk comprising file data has already been stored. In the example shown, a hash of a chunk is received (or computed) (1102). A Bloom filter is checked to determine if the chunk may already have been stored in the object store (1104). A "negative" or "false" result from the Bloom filter (1106) results in an indication that the chunk is not already present in the object store and needs to be stored being returned (1108). If the result is positive or "true" (1106), the hash is used to query the chunk metadata table (1110). If the query returns a result indicating the chunk is represented already in the chunk metadata table (1112), a result indicating that the chunk already has been added to the object store is returned (1114). Conversely, if hash is not found in the chunk metadata table (1112), an indication that the chunk is not already present in the object store and needs to be stored is returned (1108).

Partitioning a Bloom filter into two or more partitions, each having a relatively smaller partition-specific filter, and distributing elements of a set among the partitions, is disclosed. In various embodiments, the number of partitions and the initial size of each may be determined statically, at least initially, based on how many elements are and/or are expected to be included in the overall set. In some embodiments, a decision to partition a Bloom filter may be made dynamically, based for example on a computed probability of a false positive (e.g., based on filter size and number of elements in the set/partition) and/or based on a count of how many elements have been removed from the set/partition, e.g., by virtue of files having been modified and/or deleted from the file system.

Figure 12:
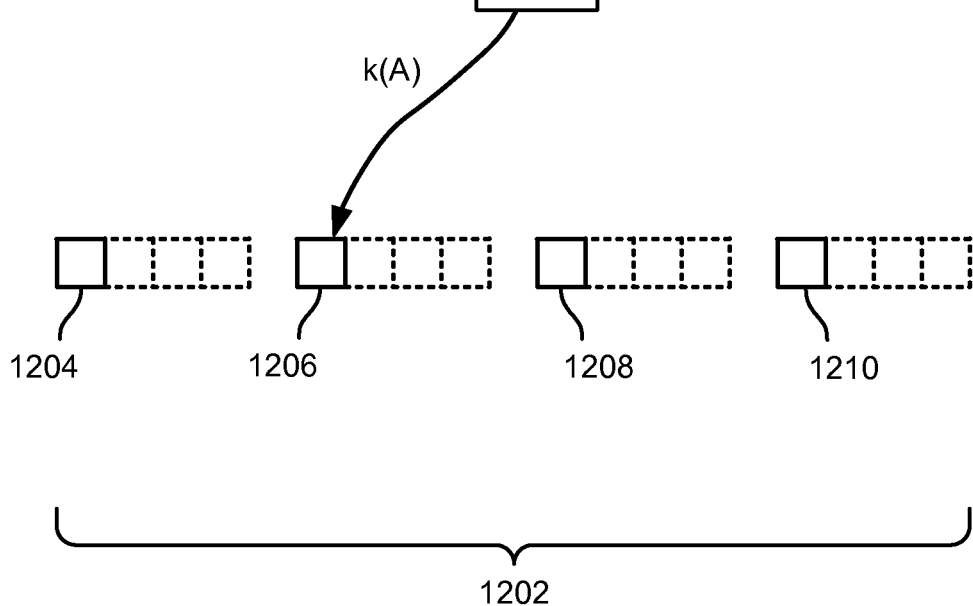
FIG. 12 is a block diagram illustrating an embodiment of a partitioned Bloom filter used in embodiments of a de-duplicating file system.

FIG. 12 is a block diagram illustrating an embodiment of a partitioned Bloom filter used in embodiments of a de-duplicating file system. In the example shown, the Bloom filter 1002 of FIG. 10 has been split into a set of partitions 1202. In this example, four partitions are shown, one each corresponding to partition-specific filters 1204, 1206, 1208, and 1210, respectively. In various embodiments, the partitioning is based on key space (e.g., the hash of the content of chunks). The object "A" in this example is mapped, based on the hash of its chunk content k(A), to the partition associated with the partition-specific Bloom filter 1206. In some embodiments, the hash value modulo the number of partitions is computed to determine which partition-specific filter to use. In some embodiments, some prescribed number of bits and/or other portion of the hash or other value may be used. In various embodiments, assignment to a partition is based on a method selected to achieve an even or nearly even distribution of elements across the partitions and to always result in a given object being mapped to the same partition and component filter. In various embodiments, a chunk may be assigned to a filter partition based on a hash of its chunk content, and within the filter partition the chunk may be mapped to one or more filter locations (indices), e.g., based on one or more (additional) hashes of the chunk contents.

In various embodiments, the partition-specific Bloom filter may initially be set to a size smaller than what may ultimately be required. If the partition-specific Bloom filter becomes too saturated, for example as a result of the number of objects associated with the partition becoming large relative to the filter size, then in various embodiments the partition-specific filter may be resized, as indicated by the dotted lines shown adjacent to each of partition-specific filters 1204, 1206, 1208, and 1210. In various embodiments, while a partition-specific filter is being resized, the file system (or other system) may continue to use the respective Bloom filters associated with other partitions to determine whether chunks mapped to those partitions may have been stored already. In addition, the amount of time the partition-specific Bloom filter may be unavailable as it is resized and rebuilt will be much less than if a single Bloom filter for the entire set had to be resized and rebuilt, resulting in a shorter window of time during which de-duplication decisions would need to be made by querying the chunk metadata table, without the benefit and use of the Bloom filter.

Figure 13:
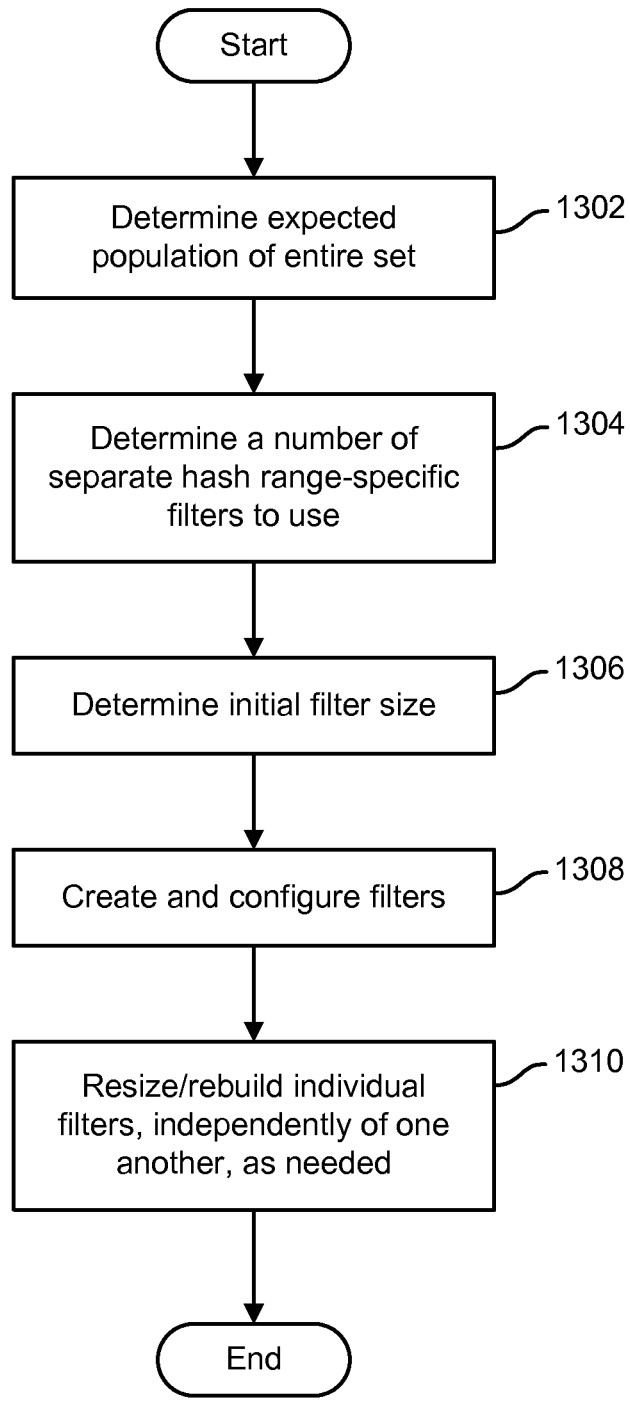
FIG. 13 is a flow chart illustrating an embodiment of a process to create and maintain a partitioned Bloom filter.

FIG. 13 is a flow chart illustrating an embodiment of a process to create and maintain a partitioned Bloom filter. In various embodiments, the process of FIG. 13 may be used to provide a partitioned Bloom filter, such as the set of filters 1202 in the example shown in FIG. 12. In the example shown, the expected population of the entire set is determined (1302). For example, in the case of a file system, the number of existing chunks may be known from the chunk metadata table and/or other metadata. For a forward looking determination, a previously-observed rate of increasing in the number of chunks, or other statistical or numerical techniques, may be used to project a future population of the set. The number of partitions to use (at least initially) is determined (1304). For example, the number of partitions may be determined based on one or more of the current and/or projected overall set size, the filter size considered to be manageable or desirable for each partition-specific Bloom filter, false positive rates considered to be acceptable, etc. The initial size of the partition-specific Bloom filters is determined (1306). For example, the number of partitions may be determined based on projected or expected set size at some time in the future (1304), whereas for each partition the initial partition size may be computed based on the current population of the partition (1306). The partition-specific Bloom filters are created and configured (1308). Individual partition-specific Bloom filters are resized and rebuilt, independently of one another, as needed (1310).

Figure 14:
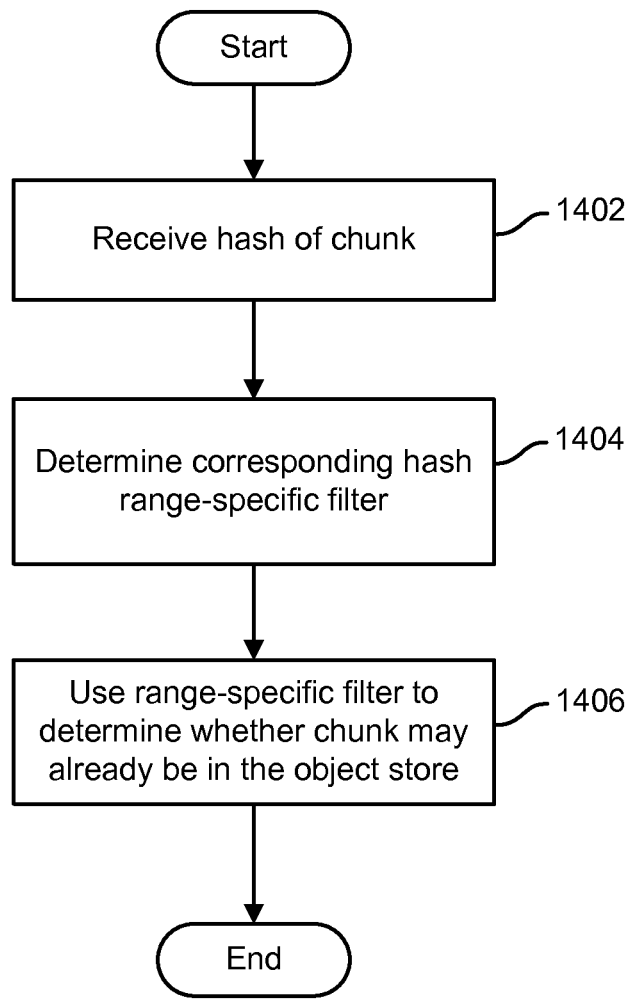
FIG. 14 is a flow chart illustrating an embodiment of a process to use a partitioned Bloom filter to determine whether a chunk comprising file data has already been stored.

FIG. 14 is a flow chart illustrating an embodiment of a process to use a partitioned Bloom filter to determine whether a chunk comprising file data has already been stored. In various embodiments, the process of FIG. 14 may be used by a file system metadata server, such as file system metadata server 110 of FIG. 1, to determine whether a chunk may already have been stored, e.g., in an object store such as cloud-based object store 112 of FIG. 1. In the example shown, a hash of a chunk is received (or computed) (1402). A corresponding hash-range specific (or otherwise-defined) partition is determined (1404). A partition-specific Bloom filter is used to determine whether the chunk may already have been stored (1406).

Figure 15:
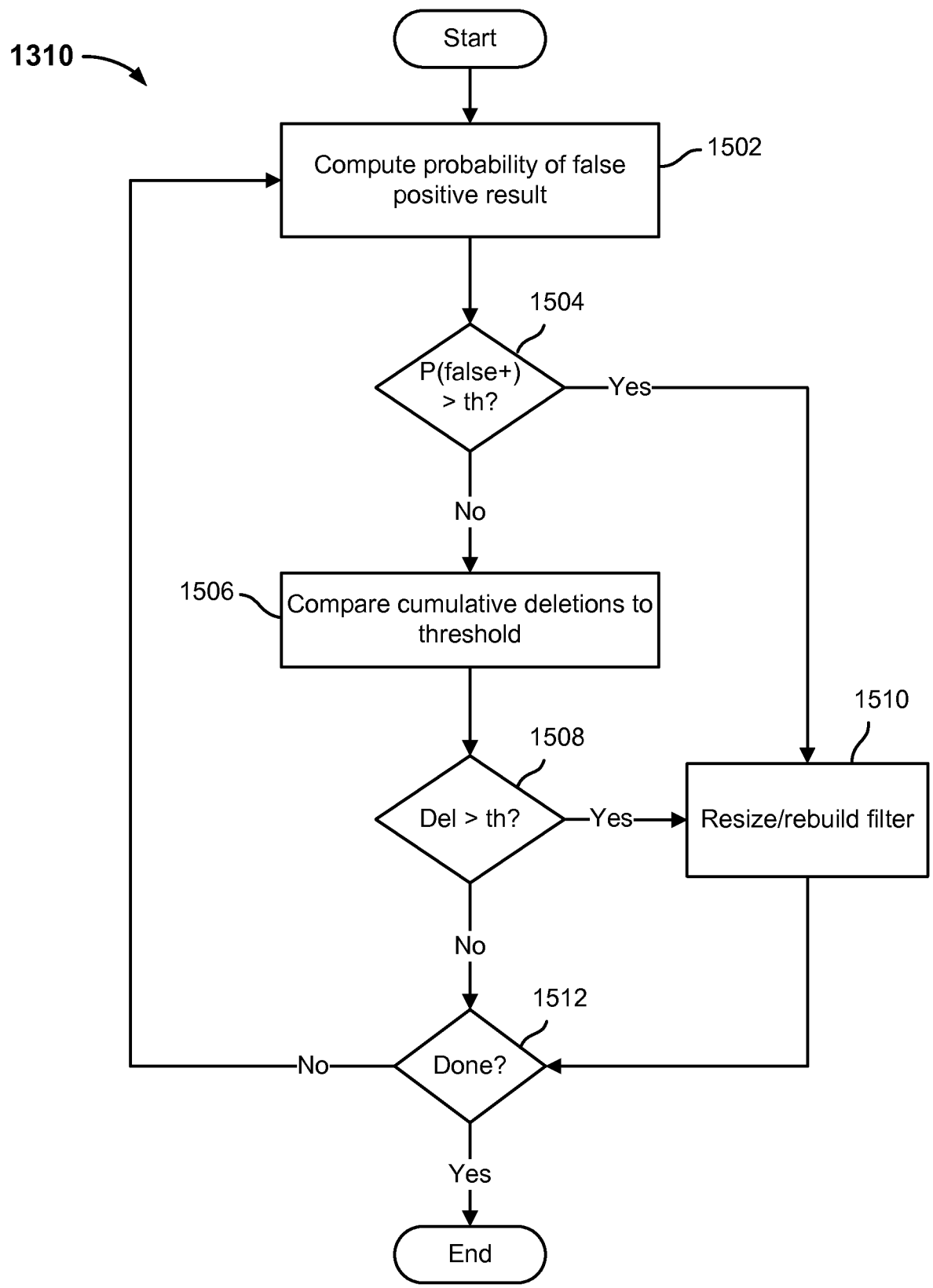
FIG. 15 is a flow chart illustrating an embodiment of a process to determine whether and/or when to resize/rebuild a component filter of a partitioned Bloom filter.

FIG. 15 is a flow chart illustrating an embodiment of a process to determine whether and/or when to resize/rebuild a component filter of a partitioned Bloom filter. In various embodiments, step 1310 of the process of FIG. 13 may include the process of FIG. 15. In the example shown, the probability of a false positive result is computed with respect to the partition-specific Bloom filter (1502). For example, the current size of the partition-specific Bloom filter and the population (number) of elements currently associated with the partition may be used to compute the probability of a false positive result. If the probability of a false positive exceeds a prescribed threshold (1504), the partition-specific Bloom filter is resized and rebuilt (1510). If the probability of a false positive result does not exceed the threshold (1502, 1504), a count of the number of elements that have been removed from the partition is compared to a corresponding prescribed threshold (1506), and if the number of deletions exceeds the threshold (1508), the partition-specific Bloom filter is resized and rebuilt (1510). If not, the probability of a false positive and/or number of deletions continued to be tracked (1512), unless/until a determination to resize and rebuild the partition-specific Bloom filter is made or the process ends, e.g., the system is taken offline for maintenance.

Figure 16:
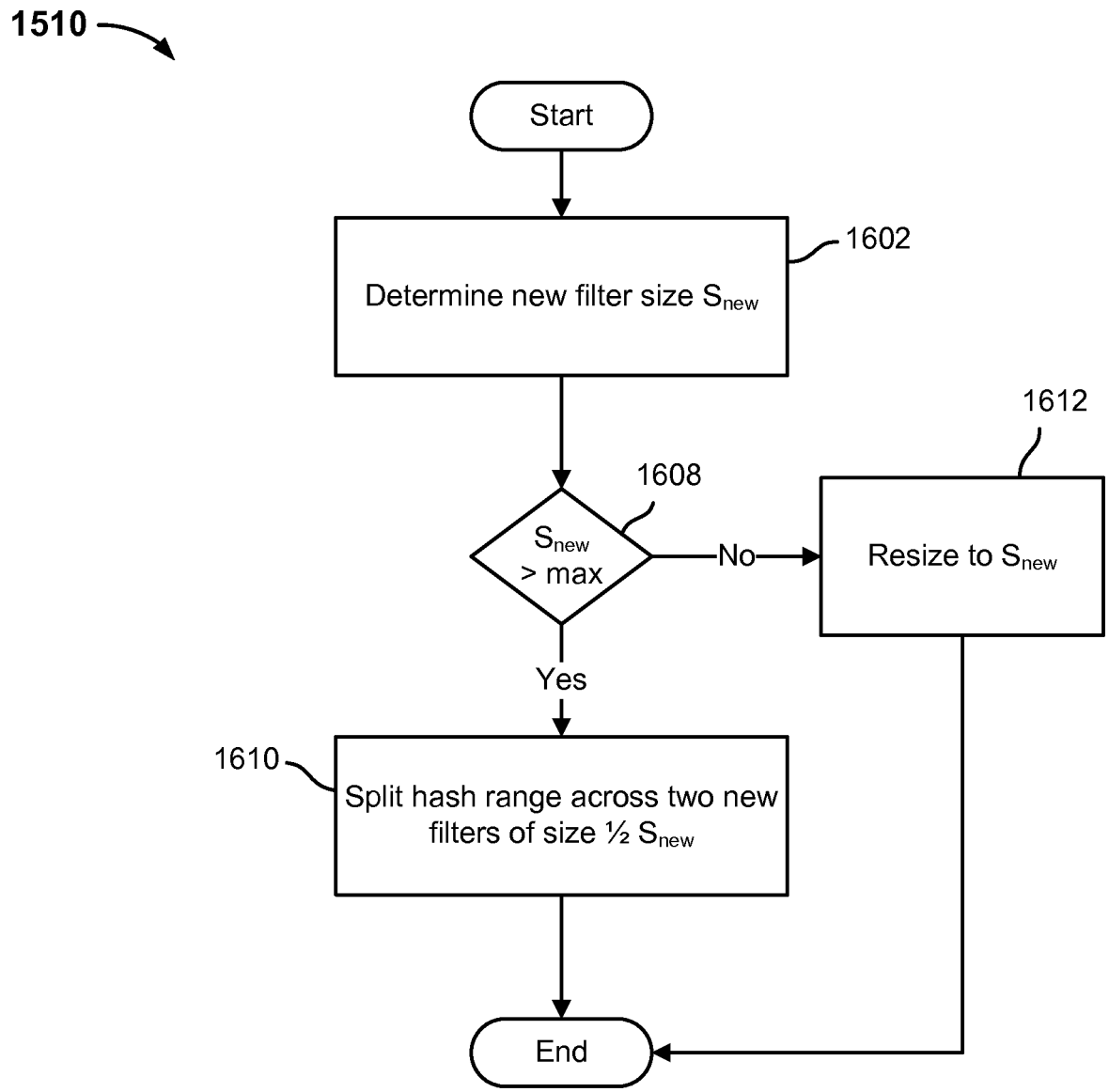
FIG. 16 is a flow chart illustrating an embodiment of a process to determine whether and/or when to split a component filter of a partitioned Bloom filter.

FIG. 16 is a flow chart illustrating an embodiment of a process to determine whether and/or when to split a component filter of a partitioned Bloom filter. In various embodiments, step 1510 of the process of FIG. 15 may include the process of FIG. 16. In the example shown, upon receiving an indication to resize a partition-specific Bloom filter (e.g., based on the computed probability of a false positive, observed false positives, number of elements removed due to file deletion, etc.) a new size $S_{new}$ to which the Bloom filter is to be resized is determined (1602). For example, the new size may be computed based on a prescribed increment by which the size is configured to be increased, and/or a size determined dynamically based on throughput and/or other observed conditions. If the new size determined to be required exceeds a prescribed maximum size (1608), the partition is further divided, for example into two sub-partitions, and a separate sub-partition-specific Bloom filter is provided for each (1610). If the required new size would not exceed the maximum (1608), the single partition-specific Bloom filter is resized to the computed new size and is rebuilt (1612).

In various embodiments, partitioned populations and associated partition-specific Bloom filters may enable the presence of an element in set to be determined using space efficient data structures, without unacceptably high false positive rates. A growing and/or very large population of elements may be managed, including by resizing and/or further partitioning partition-specific Bloom filters, as needed, independently of one another, minimizing filter unavailability.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, by one or more processors, a representation of an item;
   using, by one or more processors, the representation to determine a particular partition with which the item is associated, wherein the particular partition with which the item is associated is one of a plurality of partitions corresponding to a volume that comprises the item, and each of the plurality of partitions have a corresponding partition-specific Bloom filter;
   determining, by one or more processors, whether the item is an element of a set with which the particular partition is associated, wherein the set comprises one or more objects stored in a distributed file system, and wherein the determining of whether the item is an element in the set comprises:
checking a partition-specific Bloom filter corresponding to the particular partition to determine if the item is an element of the set;
in response to determining that the partition-specific Bloom filter indicates that the item is not an element of the set, determining that the item is not an element of the set; and
in response to determining that the partition-specific Bloom filter indicates that the item is an element of the set,
querying a table associated with the set for the representation of the item, and
determining that the item is an element of the set in the event that the querying of the table associated with the set indicates that the set includes the item;
dynamically determining to partition or resize the partition-specific Bloom filter based at least in part on a computed probability of the partition-specific Bloom filter rendering a false positive, the computed probability being based at least in part on one or more of a filter size and a number of elements in the particular partition corresponding to the partition-specific Bloom filter; and
in response to determining to partition or resize the partition specific Bloom filter, partitioning or resizing the partition-specific Bloom filter independent of one or more other partition-specific Bloom filters corresponding to one or more other partitions of the plurality of partitions.

2. The method of claim 1, wherein the Bloom filter comprises a counting Bloom filter.

3. The method of claim 1, wherein the particular partition comprises a subset of the set.

4. The method of claim 1, wherein the representation comprises a hash.

5. The method of claim 1, wherein item comprises a chunk included in a set of one or more chunks into which a file has been segmented.

6. The method of claim 1, wherein the item comprises a chunk of data and representation comprises a hash of the chunk of data.

7. The method of claim 1, further comprising determining a number of partitions to associate with the set.

8. The method of claim 7, further comprising determining for one or more of the plurality of partitions an initial size of a corresponding partition-specific Bloom filter.

9. The method of claim 1, further comprising determining that the partition-specific Bloom filter is to be resized.

10. The method of claim 9, wherein the particular partition comprises a first partition; and further comprising resizing the partition-specific Bloom filter associated with the first partition without affecting operation of one or more other partition-specific Bloom filters associated the one or more other partitions of the plurality of partitions.

11. The method of claim 1, further comprising determining to rebuild the particular partition based at least in part on a count reflecting a number of items that have been removed from the particular partition.

12. The method of claim 1, further comprising:
dynamically determining whether to partition or resize the partition-specific Bloom filter based at least in part on a number of observed false positive results with respect to the partition-specific Bloom filter.

13. The method of claim 1, wherein:
the one or more other partition-specific Bloom filters corresponding to the one or more other partitions of the plurality of partitions are responsive to queries during the partitioning or resizing of the partition-specific Bloom filter.

14. A system, comprising:
a processor configured to:
receive a representation of an item;
use the representation to determine a particular partition with which the item is associated, wherein the particular partition with which the item is associated is one of a plurality of partitions corresponding to a volume that comprises the item, and each of the plurality of partitions have a corresponding partition-specific Bloom filter;
determine whether the item is an element of a set with which the particular partition is associated, wherein the set comprises one or more objects stored in a distributed file system, and wherein the determining of whether the item is an element in the set comprises:
checking a partition-specific Bloom filter corresponding to the particular partition to determine if the item is an element of the set;
in response to determining that the partition-specific Bloom filter indicates that the item is not an element of the set, determining that the item is not an element of the set; and
in response to determining that the partition-specific Bloom filter indicates that the item is an element of the set,
querying a table associated with the set for the representation of the item, and
determining that the item is an element of the set in the event that the querying of the table associated with the set indicates that the set includes the item;
dynamically determine to partition or resize the partition-specific Bloom filter based at least in part on a computed probability of the partition-specific Bloom filter rendering a false positive, the computed probability being based at least in part on one or more of a filter size and a number of elements in the particular partition corresponding to the partition-specific Bloom filter;
in response to determining to partition or resize the partition specific Bloom filter, partition or resize the partition-specific Bloom filter independent of one or more other partition-specific Bloom filters corresponding to the one or more other partitions of the plurality of partitions; and
a storage device coupled to the processor and configured to store the partition-specific Bloom filter.

15. The system of claim 12, wherein the particular partition comprises a subset of the set.

16. The system of claim 12, wherein the representation comprises a hash.

17. The system of claim 12, wherein item comprises a chunk included in a set of one or more chunks into which a file has been segmented.

18. The system of claim 12, wherein the item comprises a chunk of data and representation comprises a hash of the chunk of data.

19. The system of claim 12, further comprising determining a number of partitions to associate with the set.

20. A computer program product embodied in a non-transitory computer readable storage medium and comprising computer instructions for:
- receiving a representation of an item;
- using the representation to determine a particular partition with which the item is associated, wherein the particular partition with which the item is associated is one of a plurality of partitions corresponding to a volume that comprises the item, and each of the plurality of partitions have a corresponding partition-specific Bloom filter;
- determining, by one or more processors, whether the item is an element of a set with which the particular partition is associated, wherein the set comprises one or more objects stored in a distributed file system, and wherein the determining of whether the item is an element in the set comprises:
  - checking a partition-specific Bloom filter corresponding to the particular partition to determine if the item is an element of the set;
  - in response to determining that the partition-specific Bloom filter indicates that the item is not an element of the set, determining that the item is not an element of the set; and
  - in response to determining that the partition-specific Bloom filter indicates that the item is an element of the set,
    - querying a table associated with the set for the representation of the item, and
    - determining that the item is an element of the set in the event that the querying of the table associated with the set indicates that the set includes the item;
- dynamically determining to partition or resize the partition-specific Bloom filter based at least in part on a computed probability of the partition-specific Bloom filter rendering a false positive, the computed probability being based at least in part on one or more of a filter size and a number of elements in the particular partition corresponding to the partition-specific Bloom filter; and
- in response to determining to partition or resize the partition specific Bloom filter, partitioning or resizing the partition-specific Bloom filter independent of one or more other partition-specific Bloom filters corresponding to one or more other partitions of the plurality of partitions.

21. The computer program product of claim 20, wherein the particular partition comprises a subset of the set.

22. The computer program product of claim 20, wherein the item comprises a chunk of data and representation comprises a hash of the chunk of data.

* * * * *